United States Patent

Marler

[15] 3,658,363
[45] Apr. 25, 1972

[54] HINGED COUPLER

[72] Inventor: Melvin L. Marler, P. O. Box 325, Bremerton, Wash. 98310

[22] Filed: Apr. 1, 1970
[21] Appl. No.: 24,584

[52] U.S. Cl. ............................................280/511, 280/512
[51] Int. Cl. .......................................................B60d 1/06
[58] Field of Search .........................280/508, 511, 512, 435

[56] References Cited

UNITED STATES PATENTS

| 1,335,211 | 3/1920 | Walker | 280/508 |
| 1,978,859 | 10/1934 | Draeger | 280/511 |
| 2,120,415 | 6/1938 | Meyer | 280/508 X |
| 2,407,464 | 9/1946 | Wilson | 280/511 |

FOREIGN PATENTS OR APPLICATIONS

| 718,118 | 10/1931 | France | 280/511 |
| 716,719 | 10/1931 | France | 280/511 |

Primary Examiner—Leo Friaglia
Attorney—Seed, Berry & Dowrey

[57] ABSTRACT

Two socket sections are pivoted to the forward end of a drawbar and are swingable laterally between an outer opened position and an inner closed position. The socket halves are provided with internal ball-retaining recesses and lower cut-out portions. A cover member has an internal surface which conforms closely to the external surfaces of said socket halves and is pivotally secured to the drawbar for swingable movement over said section halves. A locking pin is insertable through said cover member and said socket halves. The forward end of the drawbar is cupped so that the drawbar and closed socket halves form a continuous spherical compartment for housing the ball of a trailer hitch.

3 Claims, 5 Drawing Figures

PATENTED APR 25 1972 3,658,363

INVENTOR.
MELVIN L. MARLER

BY *Seed, Berry Dawney*

ATTORNEYS

HINGED COUPLER

BACKGROUND OF THE INVENTION

1. Field of the Invention

This invention pertains to couplers for securing the ball of a towing vehicle to the drawbar of a towed vehicle.

2. Description of the Prior Art

The coupler customarily employed to join house trailers, boat trailers, or other towed vehicles to the towing vehicle, include a socket fixed to the drawbar of the towed vehicle which socket fits over the ball of the towing vehicle. The socket is locked onto the ball by a clip or locking block which is slid forwardly against the underside of the ball once in the socket. This coupler suffers from several disadvantages: Firstly, the locking block or clip may be easily damaged while backing the towed vehicle. Secondly, this type of coupler is expensive to manufacture. Thirdly, it is necessary to raise the socket and thus the towed vehicle above the ball on the towing vehicle each time the towed vehicle is connected or disconnected from the towing vehicle.

Another form of coupler utilizes a pair of jaws that may be opened to allow reception of the ball of the towing vehicles; however, this form of coupler heretofore known has been expensive to manufacture, highly susceptible to wear particularly when backing the trailer, and are subject to inadvertent release.

SUMMARY OF THE INVENTION

This invention pertains to a coupler which includes two socket sections that may be opened to receive the ball and then closed around the ball. When closed and locked in place it is virtually impossible for the ball to be accidentally removed from the socket sections. It is also unnecessary to raise the socket sections above the ball when connecting or disconnecting the towed vehicle from the towing vehicle. Still a further advantage is that the construction is simple and thus inexpensive to manufacture and maintain and is not easily damaged when reversing the trailer.

It is therefore an object of the invention to provide a coupler that is inexpensive to manufacture and easy to use.

Another object is to provide a coupler that may be connected without raising the towed vehicle.

Another object of the invention is to provide a coupler that is safe to use and is not easily damaged by forward or reverse vehicle operation.

In the preferred form of the invention the socket sections comprise two socket halves which are hinged to the forward end of the drawbar. The socket halves are locked in place by a cover member which is swung over and embraces the closed socket halves and a locking pin which is insertable through the cover member and the socket halves.

DESCRIPTION OF THE PREFERRED EMBODIMENT

Figure 1:
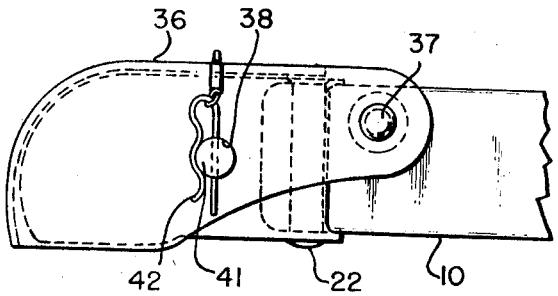
FIG. 1 is a side elevation of a coupler embodying the principles of the invention.
Figure 2:
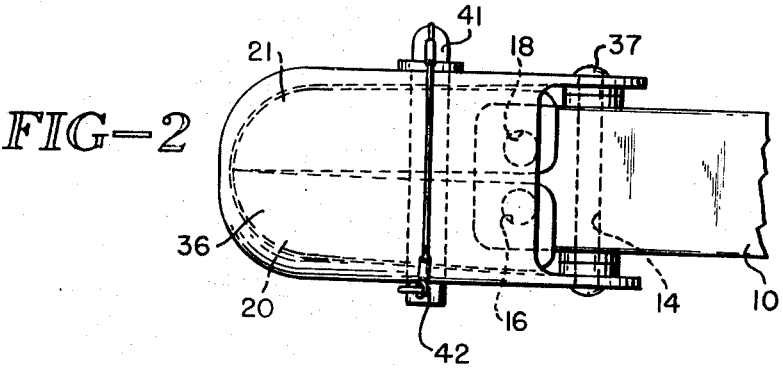
FIG. 2 is a plan view of the coupler shown in FIG. 1.
Figure 3:
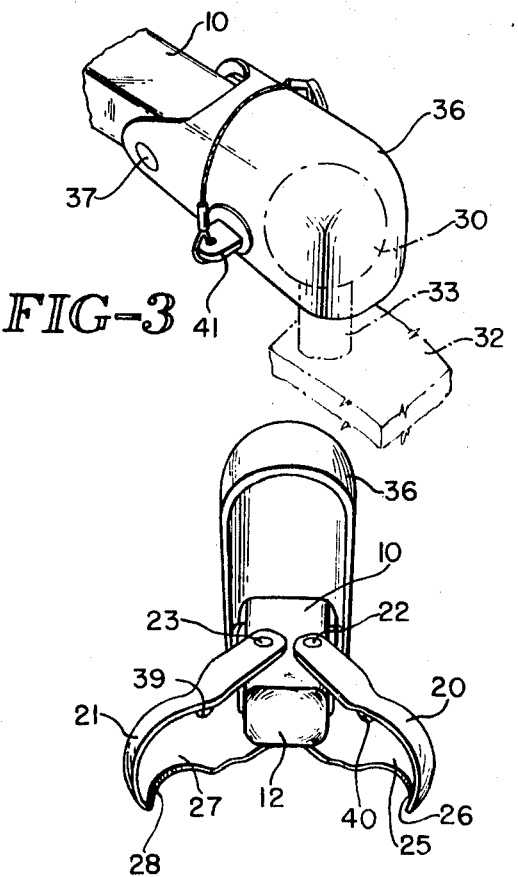
FIG. 3 is an isometric of the coupler shown in FIG. 1 with the ball of a towing vehicle shown in phantom.
Figure 4:
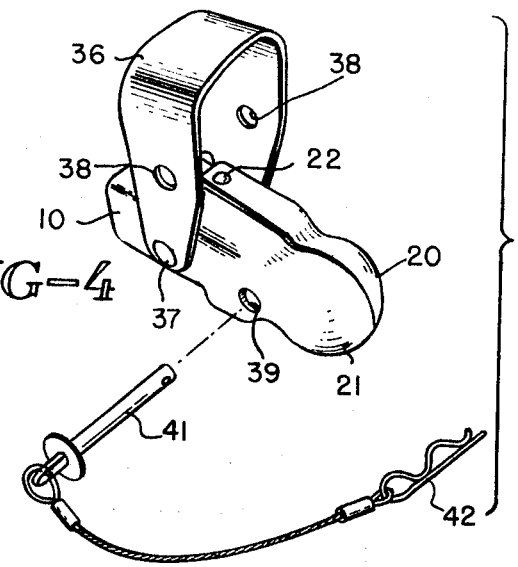
FIG. 4 is an isometric of the coupler shown in FIG. 1 with the cover member swung upwardly.
Figure 5:
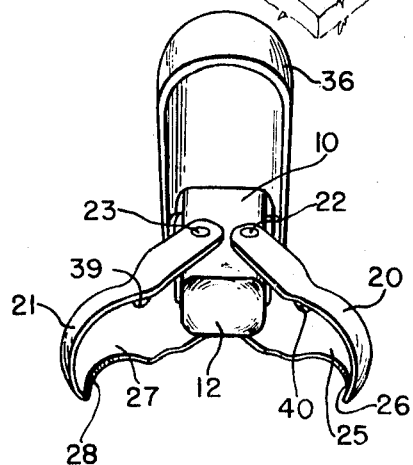
FIG. 5 is an isometric of the coupler shown in FIG. 1 with the coupler member swung upwardly and the socket sections swung laterally into their opened position.

A drawbar 10 is illustrated in the drawings as having a forward cupped end 12. The drawbar is provided with a transverse, horizontal bore 14 and a pair of transversely spaced vertical bores 16 and 18. As best shown in FIG. 5 a pair of socket sections or halves 20 and 21 are pivotally secured to the forward end of the drawbar 10 by pivot pins 22 and 23 which are secured respectively in the bores 16 and 18. The socket half 20 includes a ball-retaining recess 25 and a lower cutout portion 26. The socket half 21 also includes a ball-retaining recess 27 and a cutout portion 28. As is readily apparent the respective ball-retaining recesses and the cupped forward end 12 of the drawbar form a continuous spherical compartment when the socket halves are closed. The spherical compartment conforms closely to the size of the spherical ball 30 mounted on the towing vehicle 32. The cutout portions 26 and 28 are aligned with the neck 33 of the ball 30 permitting the ball 30 to rotate within the spherical compartment formed by the socket halves.

A cover member 36 is pivotally secured to the drawbar by a horizontal pinot pin 37 which is secured in the bore 14. The cover member is hollow and includes an internal cavity that closely conforms to the external shape of the socket halves 20 and 21 when in the closed position. When the cover member is closed over the socket halves the socket halves are held together tightly. The cover member is provided with spaced openings 38 which align with openings 39 and 40 in the respective socket halves. A locking pin 41 is insertable through the openings 38, 39 and 40 and is releasably secured by a conventional key 42.

In operation, the locking pin 41 is removed and the cover member 38 raised to allow the socket halves 20 and 21 to be swung laterally outward into an opened position. The towing vehicle is then backed until the ball 30 is aligned with the forward cupped end 12 of the drawbar 10. Advantageously the towed vehicle will be resting on a support or the like which will position the forward end of the drawbar at the same elevation as the ball, that is, at the same elevation as when the coupler was previously disconnected from the towing vehicle. Next the socket halves are closed over the ball and the cover member 36 lowered. Finally, the locking pin 41 is inserted through the openings 38, 39 and 40 and the key 42 secured to lock the cover member over the socket halves. As is readily apparent it is virtually impossible for the ball to be accidentally removed from the socket halves. Backing of the towing vehicle will advantageously apply the loading forces against the drawbar not the coupler. The couplings of the towing and towed vehicles may obviously be performed quickly and with certainty.

While the preferred form of my invention has been illustrated and described it should be understood that variations will be apparent to one skilled in the art. Accordingly, it is intended that the invention not be limited to the specific form illustrated but that the claims appended hereto be given the broadest interpretation possible.

The embodiments of the invention in which an exclusive property or privilege is claimed are defined as follows:

1. A coupler for securing a trailer drawbar or the like to a ball secured to the towing vehicle comprising drawbar means, socket sections pivotally secured to said drawbar means and laterally swingable between an outer opened position and an inner closed position, said socket sections each including ball-retaining recesses and lower cutout portions, and means for locking said socket sections in said closed position, said locking means including a cover member swingable over said socket sections and a locking pin insertable through said cover member and said socket sections.

2. The coupler of claim 1 wherein said drawbar terminates in a forward cupped end, said cupped end and said ball-retaining recesses forming a continuous spherical compartment for holding said ball.

3. The coupler of claim 1 wherein socket sections and said cover member are secured directly to said drawbar.

* * * * *